Hollister B. Sykes  Inventor

United States Patent Office 2,703,015
Patented Mar. 1, 1955

2,703,015

DEVICE FOR DETERMINING ENTRAINMENT FROM PLATE TO PLATE IN A BUBBLE PLATE TOWER

Hollister B. Sykes, Roselle, N. J., assignor to Standard Oil Development Company, a corporation of Delaware Application June 30, 1950, Serial No. 171,400

1 Claim. (Cl. 73—422)

The present invention is concerned with improvements in plate columns for use in fractional distillation and other purposes where intimate contact to obtain equilibrium between vapor and liquid is sought, and in which the liquid descending the column is retained to a certain depth on each plate, and the vapors ascending the column are caused to bubble through these layers of liquids.

In practice the fractionating or other columns generally favored are of the bell type in which a solid horizontal plate is provided with a number of vapor pipes covered by bells.

The less generally used perforated plate column consists of a cylinder containing horizontal plates or partitions provided over the whole surface with small holes through which the ascending vapor bubbles into the liquid on each plate. The descending liquid flows down from plate to plate through overflow pipes, the lower ends of which are sealed in the liquid, usually, with the aid of a cup, on the plate below.

The capacity of such liquid-vapor contacting towers is often limited by entrainment of the liquid from one plate or tray up to the next and from the top plate into the overhead stream. In general, entrainment increases with liquid and/or vapor throughput. Increased entrainment increases the tower loading and decreases the contacting efficiency and product quality, thereby setting a limit to the tower capacity if product specifications are to be met.

Thus, it is desirable to have a device which will indicate or measure the entrainment through various plates in a tower where the capacity is limited by entrainment. Determination of the maximum allowable entrainment for optimum capacity can then be made. Such a device would be especially useful in equipment performance tests and could be adapted to use in experimental studies.

It is therefore the main object of the present invention to provide a simple means for obtaining a representative measurement of the amount of liquid entrainment in the vapor stream entering any given plate.

This and other objects of the invention are accomplished by connecting one or more plates, either (1) a specially installed sampling riser, or (2) one of the usual chimneys or risers, with an entrainment separator from which the individual vapor and liquid streams are separately withdrawn and measured.

Figure 1:
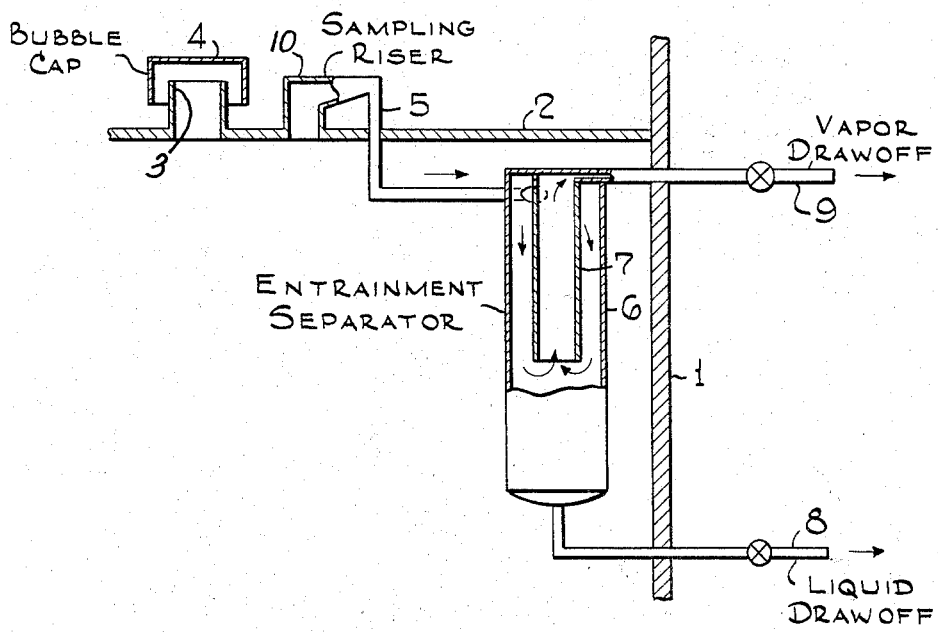
Figure 2:
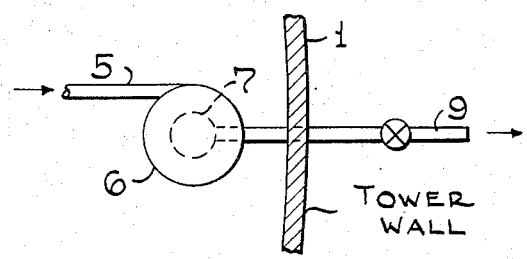

Certain preferred details of construction together with additional objects and advantages will be apparent and the invention itself will be best understood by reference to the following specification and to the accompanying drawings wherein:

Fig. 1 is a vertical cross-section through a column embodying the present invention and is fragmentary in character showing a portion of one plate of the tower; and Fig. 2 is a top view of the entrainment separator of this invention.

Referring to the drawings, the column here illustrated has a casing 1 within which, as is customary, are arranged a series of plates 2 carrying a plurality of flues 3 projecting upwardly therefrom and covered with imperforate caps 4. In accordance with the invention at least one of the flues 3, or a specially installed flue or riser 10, as shown, is connected by line 5 with vapor-liquid separator 6. Line 5 enters separator 6 at a tangent as indicated in Fig. 2. This separator is provided with annular tube 7, open at one end and spaced within separator 6, the open end thereof extending to a point near the bottom of the separator. In this manner the vapor-liquid mixture enters the separator tangentially of the surface of the annular tube whereby its vapor velocity is reduced and the entrained liquid is deposited on the outside walls of the separator. The separated liquid then flows down the walls into the lower part of the separator from which it is drawn off through line 8 to be measured. The vapor passes down outside the annular tube 7, then up the central passage and is drawn off from the top of the separator through line 9 to be measured.

The entrainment separator 6 is placed inside the tower and below the tray 2 so as to assure the same temperature throughout the sampling system, thus preventing partial flashing of the entrained liquid to vapor or condensation of the vapor to liquid, as may happen if the sample is removed from the tower before separation of entrainment. Exception to this placement of the entrainment separator occurs where the equilibrium conditions of the vapor-liquid system being sampled are such that no vaporization or condensation of the liquid or vapor takes place at the ambient temperature external to the tower. In this case the entrainment separator can be placed outside.

In practice the rate of drawoff of the vapor is regulated to give a dry vapor velocity through the sampling riser 10 approximately equal to the dry vapor velocity through the plate openings of the plate contacting devices (e. g., equal to the velocity through the bubble cap risers).

More than one sampling riser can be installed on a given plate, each leading to the same or to individual entrainment collectors. Various standard methods can be used to measure the collected entrained liquid and separated vapor. The entrained liquid may be drawn off in a closed container and weighed. If noncondensable at ambient temperature, the vapor may be measured by a wet test meter or if condensable it may be condensed and weighed.

The entrainment measuring device above described can be used in any plate or tray type column where the vapor is contacted by bubbling through the liquid. This includes distillation and absorption equipment in particular. Such a method can also be used to measure entrainment from flash drums or reboiler surge drums. In these cases the entrainment separator is installed outside the drum and the sampling tap in the overhead vapor line.

The nature and objects of the present invention having been thus described and illustrated, what is claimed as new and useful and is desired to be secured by Letters Patent is:

In an apparatus for contacting vapors with liquids including a contacting tower, a plurality of plates within said tower disposed transversely thereof in vertically spaced relation one to another to form a vertical series of superposed contacting chambers within said tower, means for passing a liquid material downwardly through said tower from plate to plate while maintaining a certain depth and level of liquid on each plate and a vapor space thereabove, a plurality of conduit passageways for vaporous materials extended upwardly through each plate and opening thereabove in vertically spaced relation thereto whereby said vapors may be passed upwardly through the tower in substantially countercurrent relation to said liquid passed downwardly, contacting said liquid as maintained on each plate in succession, a means for determining entrainment of liquids in said vapors subsequent to passage through said conduit passageways and the liquid maintained on one of said plurality of plates, which means comprises a closed elongated vessel disposed within the chamber above said last mentioned plate, a tubular baffle member disposed within said vessel concentrically thereof and in radially spaced relation thereto, said baffle fixed in fluid tight relation to the upper end of said vessel and opening downwardly into spaced relation to the lower end thereof, a conduit having a discharge end opening into said vessel tangentially at the upper end thereof exteriorly of said baffle, and an inlet end communicating with at least one of said plate conduit passageways through the plate next above said chamber and forming a continuation thereof, an outlet conduit for vapors opening from said vessel within the upper end of said baffle, an outlet conduit for liquids opening from said vessel below said baffle, each of said outlet conduits extending outwardly through a wall of said column, and means in each outlet conduit for controlling fluid flow therethrough.

References Cited in the file of this patent

UNITED STATES PATENTS

| | | |
|---|---|---|
| 1,808,088 | Urquhart | June 2, 1931 |
| 2,251,771 | Wynn et al. | Aug. 5, 1941 |
| 2,306,606 | Hirsch | Dec. 29, 1942 |
| 2,543,001 | Dean | Feb. 27, 1951 |